Patented May 16, 1950

2,508,272

UNITED STATES PATENT OFFICE 2,508,272

COOLING GASEOUS SUSPENSIONS OF TITANIUM DIOXIDE IN THE PREPARATION OF TITANIUM DIOXIDE PIGMENTS FROM TITANIUM TETRACHLORIDE

James E. Booge, Wilmington, Del., assignor to E. I. du Pont de Nemours & Company, Wilmington, Del., a corporation of Delaware No Drawing. Application July 23, 1947, Serial No. 763,176

11 Claims. (Cl. 23—202)

This invention relates to vapor phase processes for the manufacture of titanium dioxide pigments from titanium halides, and more particularly to a method for cooling the products of such a process.

The vapor phase process for preparing such pigments generally comprises, in brief, the attack of a titaniferous ore with a gaseous halogen at elevated temperatures in the presence of a reducing agent, recovery and purification of the resulting titanium halide vapors, and reaction of the said vapors with an oxygen-containing gas in a suitable reaction chamber at high temperatures. The products of this vapor phase oxidation step issue from the reaction vessel in the form of a finely-divided solid titanium oxide, suspended in large volumes of hot, corrosive halogen-containing gases. The rapidity with which this gaseous suspension is cooled to below a reactive temperature determines to a great extent the precision with which the reaction can be controlled. At reactive temperatures the solid particles of titanium oxide will continue to grow rapidly in size as additional material forms and deposits on them, or as individual particles coalesce. Consequently, rapid quenching of the reaction to a relatively inactive temperature range is a prime requisite where the solid product is desired in a finely divided state. For greatest economy, processes for the oxidation of titanium halides are generally cyclic, with the by-product halogen being recycled to halogenate more of the titanium-bearing ore, producing additional quantities of the desired titanium halide for oxidation. It is important that the gases issuing from the oxidation chamber be maintained in as concentrated a state as possible, to permit their use for halogenation without expensive pretreatment to remove undesirable diluents. Therefore, quenching with cold air, the method ordinarily used for cooling finely divided solids, is impractical in the present application.

Quenching is achieved commercially by several means, with varying degrees of success. One method makes use of heat-exchange tubes, a relatively cool fluid being passed through the tubes, and the hot gases being circulated around them. The material of construction of such tubes presents a major problem where the gases are corrosive, as in the case of these halogen-containing products. The use of this type of indirect cooling apparatus is particularly unsatisfactory for cooling gaseous suspensions of solids. When the hot material comes in contact with the heat exchange surfaces and is cooled, the solid particles are deposited on the cold surfaces, gradually building up thereon as a thick coating. If, as in the case of pigment titanium dioxide, the solid is a non-conductor, the end result is that the tubes quickly become insulated, heat transfer is greatly reduced, and the overall efficiency is rendered very poor.

Separation of the solid oxide and hot product gases prior to cooling would make the cooling step easier, but, even if the separation could be accomplished quickly enough to permit quenching before particle growth was excessive, the corrosive nature of the gases makes the design of such a separating apparatus extremely difficult. Furthermore, it is characteristic of titanium dioxide that it is slightly plastic at elevated temperatures, with the result that its tendency to form a coating on the surfaces with which it comes in contact is accentuated. In a cyclone-type separator, for example, material depositing on the walls interferes with effective operation, and soon plugs the apparatus completely unless complex scraping devices are employed.

It is accordingly an object of this invention to overcome the above and other disadvantages of prior art processes. A particular object is to cool hot corrosive gaseous suspensions of finely divided titanium dioxide. Another object is to minimize particle growth of such titanium oxide during the quenching operation. Yet another object is to effect the cooling under conditions allowing optimum heat transfer efficiency. A further object is to minimize buildup of titanium oxide on the surfaces of the conduits of the chamber during the cooling operation. An additional object is to quench hot gaseous materials without substantially diluting the same with objectionable foreign substances. Still another object is to cool large volumes of gases in equipment that is of relatively simple construction. A specific object is to effect cooling of suspensions of titanium dioxide in hot halogen-containing gases.

The above and other objects are realized by the following invention which broadly comprises cooling a suspension of titanium oxide in hot, halogen-containing gases by contacting it with a further quantity of the same gases, cooled and recycled. Heat transfer is effected between the hot materials and the relatively cold gases, whereby the former are rapidly cooled.

The invention may be more specifically described by reference to a preferred embodiment. A well known process for the preparation of titanium oxide pigments involves the chlorination of titanium ore and the subsequent oxidation in the vapor phase, by oxygen, air, or other oxygen-containing gases, of the resulting titanium chlorides, in accordance, for instance, with the co-pending application of Holger H. Schaumann, Serial Number 653,428, filed March 9, 1946, now Patent No. 2,488,439. The oxidation reaction itself is exothermic, and high temperatures usually obtain therein, generally in the range of 900° to 1350° C. The titanium oxide product is recovered suspended in a gas mixture, which latter comprises liberated chlorine, perhaps excess oxygen, nitrogen, and the like. The suspension is of course at a very high temperature and must be cooled drastically and rapidly in order to prevent excessive growth of the $TiO_2$ particles and to allow the easy separation of the solid material. Because of the high temperatures and the corrosive nature of the chlorine-containing gases, this cooling in a rapid manner is normally a difficult and costly step. According to the present process, however, the hot $TiO_2$ suspension is simply contacted with a further quantity of the same mixture of gases which has previously been substantially freed from suspended titanium oxide particles and cooled to a comparatively low temperature. The latter cooling step is easily performed in a heat-exchanger of the usual type, since the absence of suspended solids permits efficient heat transfer through surfaces, and the rapidity of cooling minimizes corrosion of the equipment. No special apparatus is required for cooling the gaseous suspension by this process, since the normal passage of the gases through a simple conduit produces sufficient mixing to effect the desired heat exchange. The added gases are heated by the hot material and absorb heat from it, so that the product of this operation is $TiO_2$ suspended in a relatively cooler gas mixture of larger volume but of the same composition as before. The solid $TiO_2$ particles are later easily removed therefrom by the action of cyclones, precipitators, filters, and other commonly used devices. The gas mixture remaining can then be divided, part of it being recycled through the cooler and used for further quenching, and part being circulated for use in the chlorination of ore, as in the usual cyclic process.

The following example is given simply as an illustration of a preferred method of carrying out this invention, and the invention is not to be limited by the details set forth.

*Example*

$TiCl_4$ vapor and air were each separately preheated to 900° C. and injected into a reaction vessel constructed of fused silica. The proportions of air and $TiCl_4$ were such as to give 10% excess $O_2$, and the air contained 1% by volume of water vapor as a seeding agent. The reaction chamber was heated initially to 1050° C. Upon admixture of the $TiCl_4$ vapor and the air, a reaction occurred whereby the $TiCl_4$ was oxidized to $TiO_2$ with the liberation of additional heat. The reactants were retained in the chamber for .2 second. The products exiting from the oxidation vessel were at a temperature of 1100° C., and comprised solid $TiO_2$ suspended in a gaseous mixture having the composition: 31% by volume of chlorine, 67% by volume of nitrogen, and 2% by volume of oxygen. This hot suspension was passed through a silica conduit, leading from the reactor to a cyclone separator, at the rate of approximately 900 cubic feet per minute of gases, containing 6.1 pounds per minute of $TiO_2$. 1015 cubic feet per minute of recycled product gases at 50° C., having the composition given above, but cooled and free from $TiO_2$, were admixed with the suspension as it passed through the conduit. The resulting mixture of gases and pigment had a temperature of 300° C.

Two cyclones in series then removed most of the pigment from the gas stream, and the remainder was taken out by a Cottrell precipitator. The $TiO_2$ was then separately collected and found to comprise fine particles having an average radius of .2 micron. Meanwhile, the gas stream, now of course occupying a lesser volume, was divided into two parts. 210 cubic feet per minute of gas were sent to chlorination apparatus to attack additional quantities of titaniferous ore and produce more $TiCl_4$ vapors, and 1015 cubic feet per minute were cooled to 50° C. by passage through a conventional tubular heat-exchanger, using river water as the cooling fluid, and then recycled to cool further amounts of the $TiO_2$ suspension issuing from the oxidation reaction vessel.

The quantity of gas to be recycled will of course be determined by the degree of cooling desired, the amount of material to be cooled, and other similar factors. Any amount, however small, will effect some quenching. In general, it will be necessary to cool the gaseous suspension at least below 800° C., and preferably below 600° C., to permit the use of metal equipment for separating the solids from the gases, and to minimize particle growth.

The method of separating the solid particles from the gases is not critical, but it will generally be desirable to use a method which removes substantially all of the solid particles, to avoid fouling the surfaces of the cooler. It is probably most economical to remove the bulk of the solids in settling chambers, baffle chambers, cyclones or other similar devices, and to accomplish the final cleaning with electrical precipitation, as suggested above. Filters can also be used conveniently, but because of the corrosive nature of the gases some inert filter medium, such as glass or asbestos fiber or the new fabric disclosed in U. S. Patent 2,404,714, will be required.

The process as described above and shown in the example, provides a means for preparing pigmentary titanium dioxide from titanium tetrachloride by vapor phase oxidation with satisfactory control of particle size. Control of particle size is essential to the development of optimum pigment properties, and elaborate precautions have generally heretofore been necessary to effect such control and to avoid growth of the particles beyond their optimum size (which is of the order of about .2 micron radius). It is necessary in such vapor phase production of $TiO_2$ to carry out the oxidation at very high temperatures in order initially to obtain proper particle dimensions and the desired crystal structure. However, these same high temperatures, if continued appreciably beyond the actual reaction stage, subsequently promote further and undesirable growth of the particles first formed. It is believed that gaseous chlorine acts to remove titania from the smaller particles and to deposit it on the larger particles under such high temperature conditions. Accordingly, one problem is to form particles of proper dimensions and then immediately to lower the temperature below the point at which growth will continue. Another important consideration is that gaseous halogens at elevated temperatures are extremely corrosive, so that ordinary metal equipment cannot generally be used until the product gases are cooled. Consequently, the materials of construction of prior art heat exchangers have been a major difficulty. Since the temperature must be dropped rapidly, i. e., usually within one minute after oxidation of the titanium tetrachloride is completed, and preferably in less than 10 seconds, and since prior art heat exchangers are complicated in design, this problem has not been easy to solve. My process now solves both of these problems in a very satisfactory and simple manner. It involves merely blending the oxidation reaction chamber effluent gases with gases of the same composition previously cooled and recycled. The hot gases containing TiO₂ in suspension become cooled, by admixture with the cooler halogen-containing gases, so rapidly that it is possible finally to recover pigment titanium dioxide of the desired particle size. Furthermore, this blending can be effected in equipment which, as compared to that of the prior art, is of the utmost simplicity.

The many advantages of this novel process are apparent. Besides those noted above, a means is hereby provided for effecting cooling of hot suspensions of solids in halogen-containing gases by a rapid and efficient heat-exchange technique, no objectionable dilution of the said gases by foreign substances occurs, and the deleterious effects of corrosion by the gases and of build-up of the solids on the surfaces of the quenching system are minimized.

I claim:

1. A method for cooling a suspension of titanium oxide in hot halogen-containing gases which comprises admixing said suspension outside of the reaction zone wherein it is produced, with an additional quantity of the halogen-containing gases which have previously been cooled and freed of their titanium oxide burden.

2. A cyclic method for cooling a suspension of titanium oxide in hot halogen-containing gases which comprises contacting said suspension outside of the reaction zone wherein it is produced, with an additional quantity of the halogen-containing gases which have previously been cooled and from which the titanium oxide burden has been removed, effecting heat transfer by the said contact, thereafter separating out the cooled titanium oxide, and returning at least part of the cooled halogen-containing gases for reuse in contacting further quantities of the hot suspension.

3. A process for the preparation of titanium oxide which comprises oxidizing a titanium halide vapor with an oxygen-containing gas within a reaction zone, mixing the product suspension of titanium oxide in hot halogen-containing gases upon discharge from said zone with additional halogen-containing gases which have previously been cooled and freed of their titanium oxide burden, and recovering the resulting cooled titanium oxide from the gaseous medium.

4. A method for cooling a suspension of titanium oxide in hot chlorine-containing gases which comprises admixing said suspension upon discharge from the reaction zone wherein it is formed, with an additional quantity of the chlorine-containing gases which have previously been cooled and freed of their titanium oxide burden.

5. A cyclic process for the preparation of titanium oxide which comprises attacking a titaniferous ore with chlorine, oxidizing the resulting titanium chloride vapors with an oxygen-containing gas within a reaction zone, mixing the product suspension of titanium oxide in hot chlorine-containing gases upon its discharge from said zone with additional chlorine-containing gases which have previously been cooled and freed of their titanium oxide burden, recovering the resulting cooled titanium oxide from the chlorine mixture, returning a part of the said chlorine mixture to attack additional titaniferous ore, and further cooling and recycling a part of the said mixture to effect cooling of additional quantities of the hot titanium oxide suspension.

6. A process for the control of particle size of titanium oxide pigment prepared by the oxidation of titanium tetrachloride which comprises rapidly quenching the oxidation products by mixing therewith recycled chlorine-containing gas which has been cooled to below 100° C. and from which titanium oxide has been separated.

7. A process for the preparation of titanium oxide which comprises oxidizing titanium chloride vapor with an oxygen-containing gas at a temperature between about 900° and 1350° C., intimately contacting the product suspension of titanium oxide in hot chlorine-containing gases with additional chlorine-containing gases which have previously been cooled and freed of their titanium oxide burden, cooling the said suspension to below 600° C. in less than one minute by means of the said contact, and recovering the cooled titanium oxide from the gaseous medium.

8. In a process for cooling a suspension of titanium oxide in hot halogen-containing gases subsequent to its discharge from a reaction zone by admixture with cool gases, the method of preventing dilution of the said halogen-containing gases which comprises separating titanium oxide from an initial quantity of the said suspension, cooling the halogen-containing gases thereafter remaining, and employing the thus-cooled gases as the medium for cooling further quantities of the said titanium oxide suspension being discharged from a reaction zone.

9. A process for controlling through rapid cooling the particle size growth of a TiO₂ pigment resulting from the vapor phase oxidation of titanium tetrachloride at temperatures ranging from 900–1350° C. within a reaction zone, which comprises directly mixing with the hot suspension of TiO₂ in chlorine-containing gases upon its discharge from said zone, sufficient chlorine-containing gases previously recovered from the process, freed of TiO₂ and cooled to about 50° C., to reduce the temperature of said suspension to below 800° C. within one minute from the oxidation reaction.

10. A process for controlling through rapid cooling the particle size growth of a TiO₂ pigment being discharged in suspension in chlorine-containing gases from a reaction zone wherein the vapor phase oxidation at temperatures ranging from 900–1350° C. of titanium tetrachloride with air containing a small amount of water vapor takes place, which comprises recycling for direct mixing with said TiO₂ suspension sufficient chlorine-containing gases from the system previously freed of TiO₂ and cooled to about 50° C., to reduce the temperature of said suspension to below 600° C. within one minute from the time of occurrence of said oxidation reaction within said zone.

11. A process for controlling through rapid cooling the particle size growth of a TiO₂ pigment obtained in the vapor phase oxidation, at temperatures ranging from 900–1350° C., of titanium tetrachloride with air containing a small amount of water vapor, which comprises directly mixing with the hot suspension of $TiO_2$-chlorine-containing gases being discharged from the reaction zone sufficient recycled chlorine-containing gases produced in the system and previously freed of $TiO_2$ and cooled to about 50° C., to reduce the temperature of said suspension to about 300° C. and within 10 seconds from the time of the oxidation reaction within said zone.

JAMES E. BOOGE.

REFERENCES CITED

The following references are of record in the file of this patent:

UNITED STATES PATENTS

| Number | Name | Date |
|---|---|---|
| 2,340,610 | Muskat et al. | Feb. 1, 1944 |